United States Patent [19]

Voznick et al.

[11] Patent Number: 5,256,279
[45] Date of Patent: Oct. 26, 1993

[54] LIQUID STORAGE SYSTEM WITH UNPRESSURIZED RESERVOIR ENGAGABLE WITH LEVEL SENSORS

[75] Inventors: Hal P. Voznick, Chino; Robert S. Bosko, Downey, both of Calif.

[73] Assignee: Carr-Griff, Inc., Santa Ana, Calif.

[21] Appl. No.: 905,578

[22] Filed: Jul. 2, 1992

[51] Int. Cl.$^5$ .................. B01D 17/12; H01H 35/18
[52] U.S. Cl. .................. 210/86; 200/61.2;
    210/104; 210/116; 210/134; 210/257.2;
    210/321.65; 222/64
[58] Field of Search .............. 210/86, 104, 109, 110,
    210/116, 117, 134, 136, 137, 257.1, 257.2, 258,
    321.65, 416.1, 416.3, 744; 222/61, 64, 65, 66;
    200/61.22, 61.21

[56] References Cited

U.S. PATENT DOCUMENTS

| | | | |
|---|---|---|---|
| Re. 32,144 | 5/1986 | Keefer | 210/137 |
| 3,493,496 | 2/1970 | Bray et al. | 210/257.2 |
| 3,774,763 | 11/1973 | Yall et al. | 210/258 |
| 3,825,122 | 7/1974 | Taylor | 210/134 |
| 3,846,295 | 11/1974 | Gibbs | 210/321.65 |
| 4,124,488 | 11/1978 | Wilson | 210/134 |
| 4,190,537 | 2/1980 | Tondreau et al. | 210/257.2 |
| 4,347,132 | 8/1982 | Davis | 210/104 |
| 4,476,998 | 10/1984 | Bonerb et al. | 222/61 |
| 4,493,435 | 1/1985 | Hartley | 222/52 |
| 4,552,656 | 11/1985 | Solomon | 210/137 |
| 4,574,984 | 3/1986 | Bonerb | 222/61 |
| 4,585,554 | 4/1986 | Burrows | 210/257.2 |
| 4,595,497 | 6/1986 | Burrows | 210/257.2 |
| 4,678,565 | 7/1987 | Norton | 210/257.2 |
| 4,728,004 | 3/1988 | Bonerb | 222/61 |
| 4,773,993 | 9/1988 | Yoda et al. | 210/136 |
| 4,780,197 | 10/1988 | Schuman | 210/136 |
| 4,801,375 | 1/1989 | Padilla | 210/257.2 |
| 4,909,934 | 3/1990 | Brown et al. | 210/321.65 |
| 5,000,845 | 3/1991 | Solomon | 210/134 |
| 5,039,411 | 8/1991 | Miller et al. | 210/257.2 |
| 5,158,672 | 10/1992 | Lagreca | 210/86 |

*Primary Examiner*—Joseph W. Drodge
*Attorney, Agent, or Firm*—Gordon L. Peterson

[57] ABSTRACT

A liquid storage system comprising a flexible, closed and freely expandable reservoir for storing liquid medium-containing material. A supply conduit conducts liquid, for example, from a reverse osmosis module, to the reservoir to expand the reservoir. A control valve is movable between an open position in which the control valve allows liquid to flow through the supply conduit to the reservoir and a closed position in which the valve blocks flow of liquid through the supply conduit to the reservoir. A discharge conduit is provided for delivering liquid from the reservoir, and a pump may be used for pumping the liquid from the reservoir through the discharge conduit. The control valve is controlled by a level sensor operable by expansion of the reservoir.

19 Claims, 4 Drawing Sheets

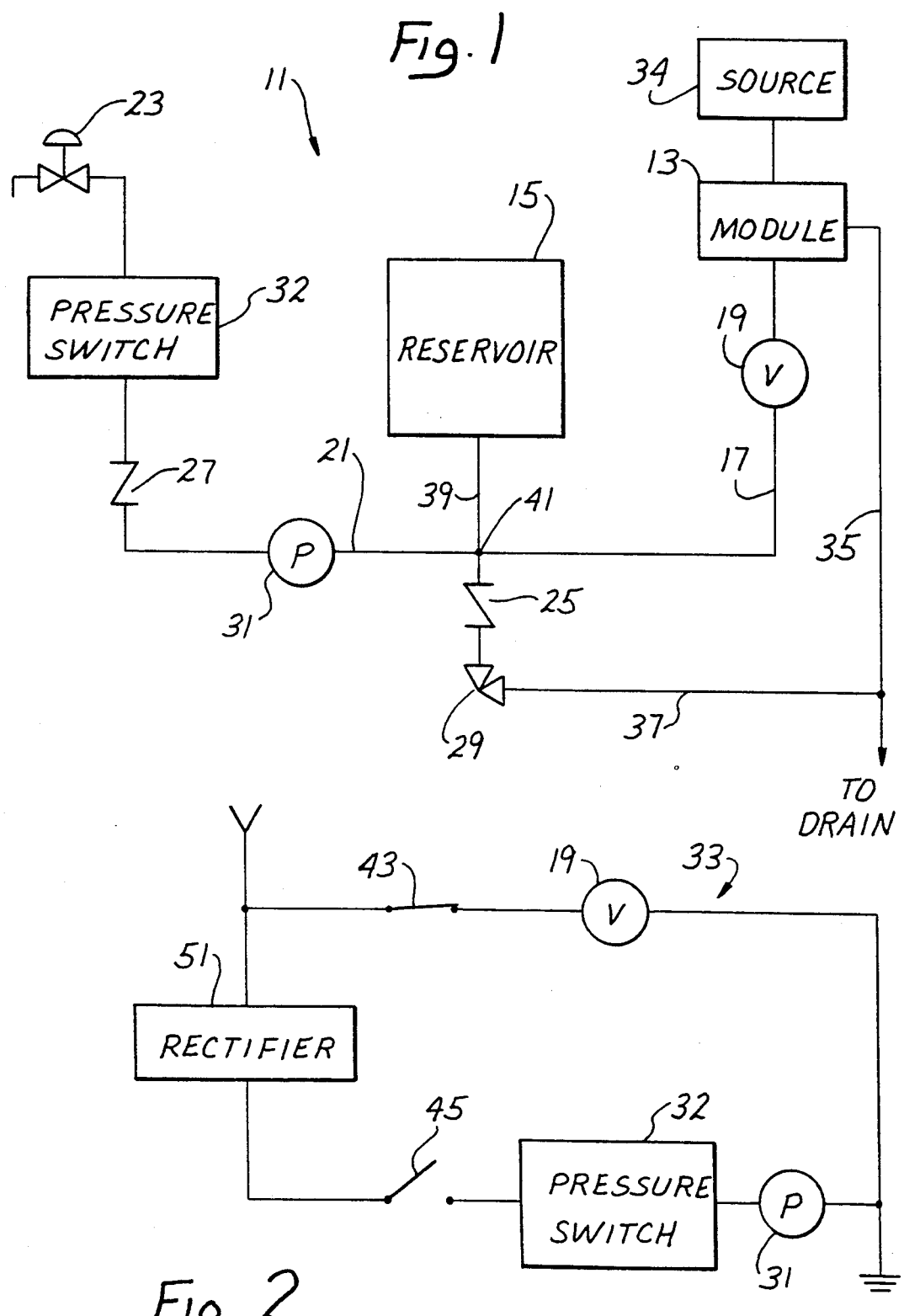

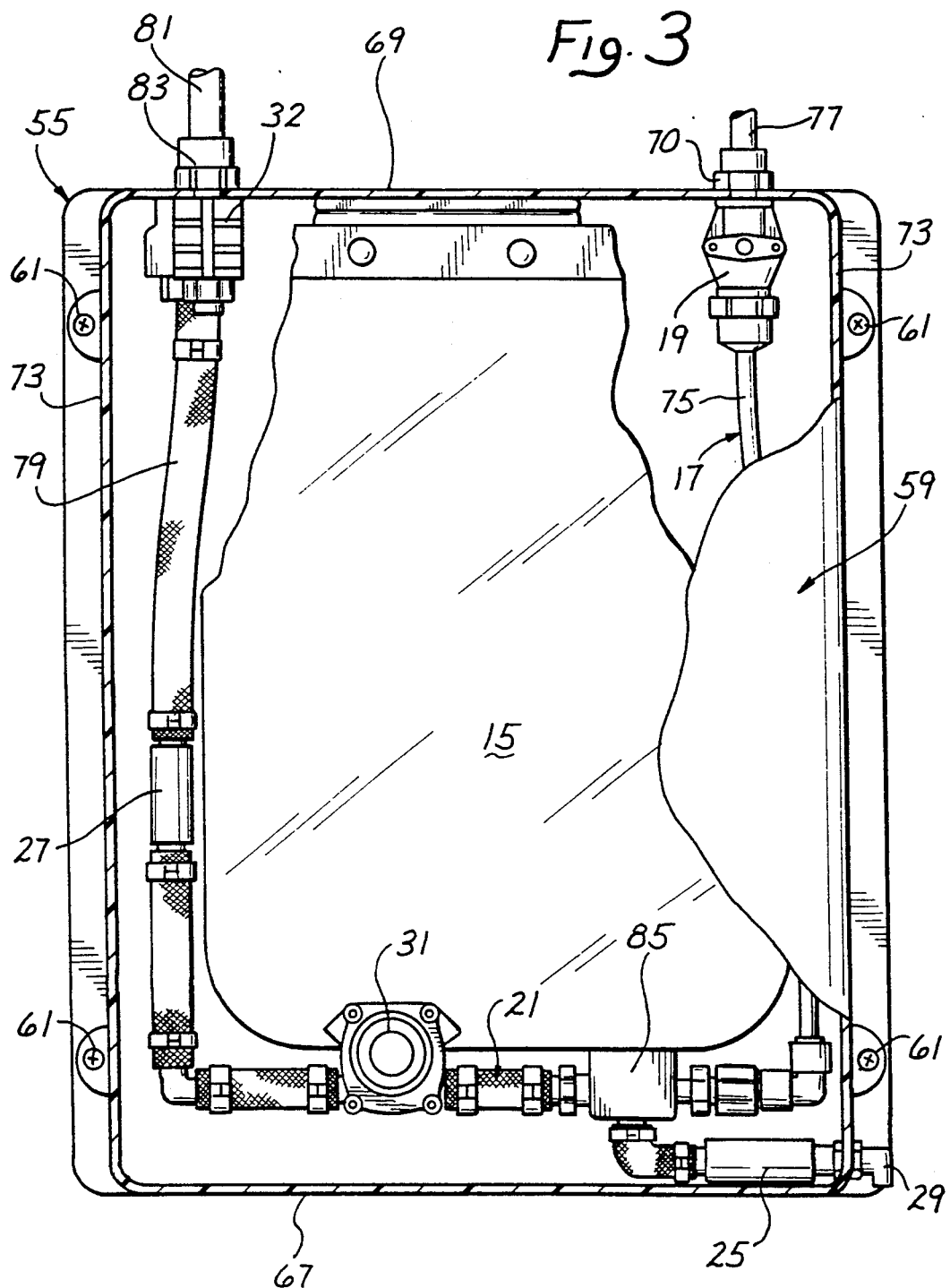

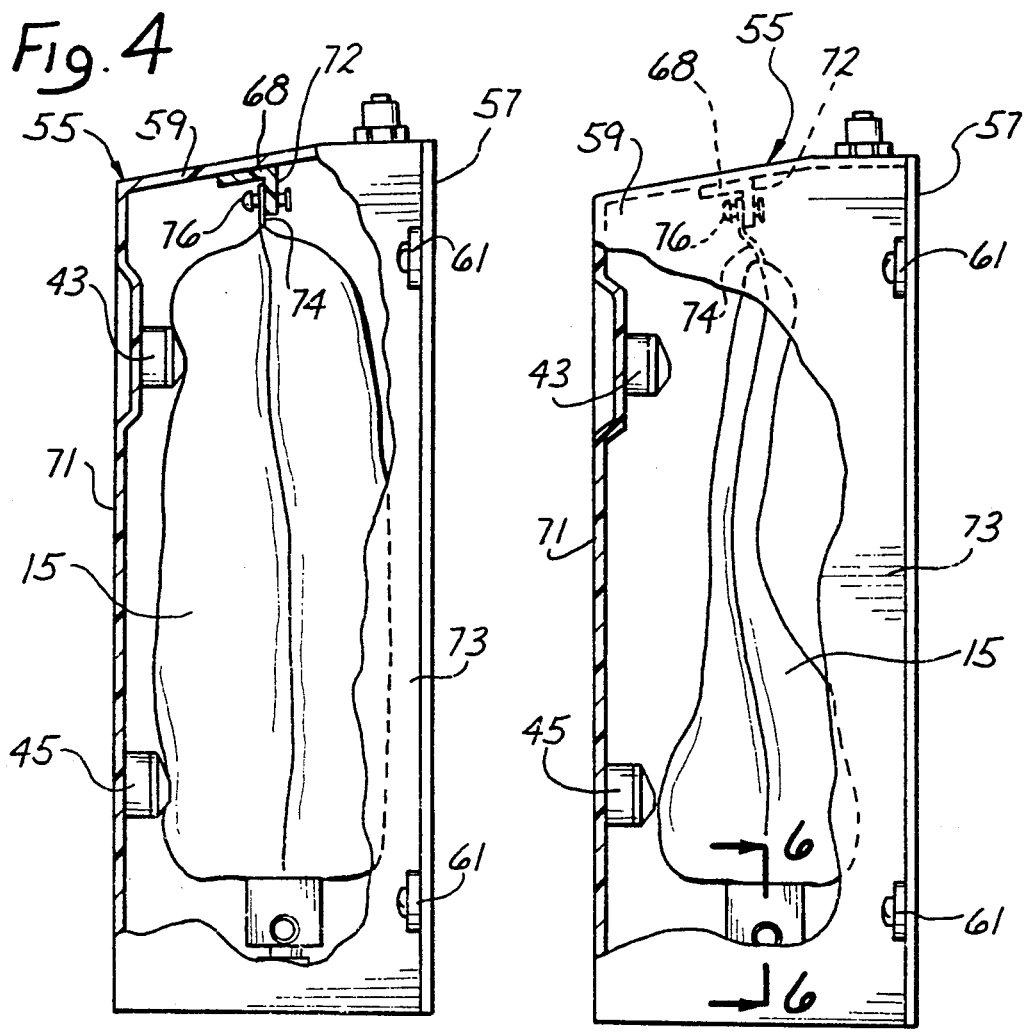
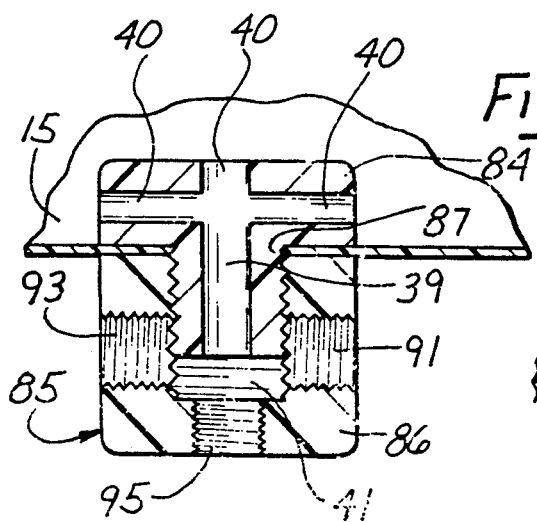
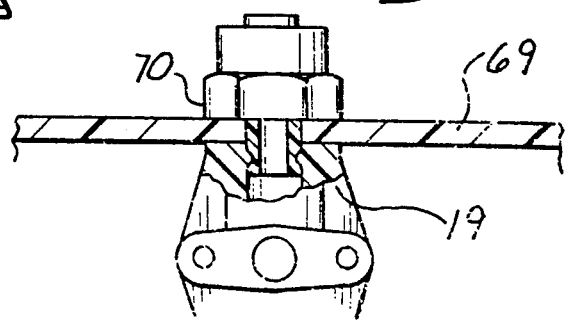

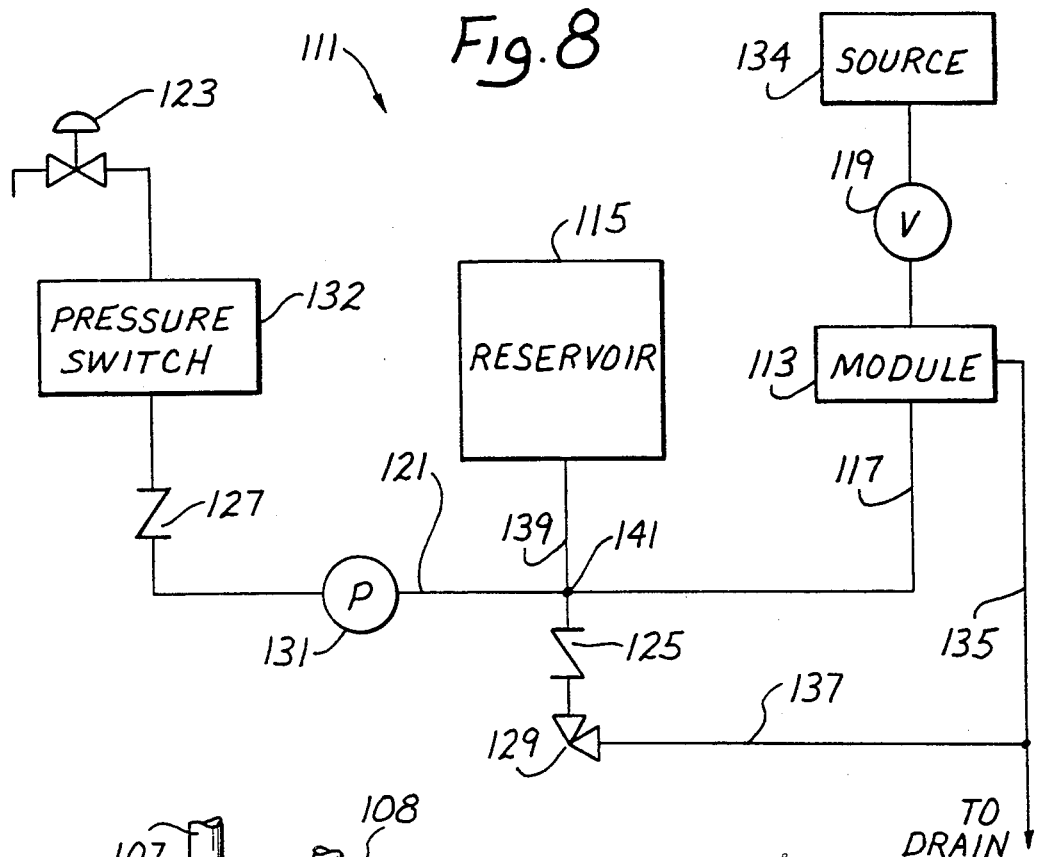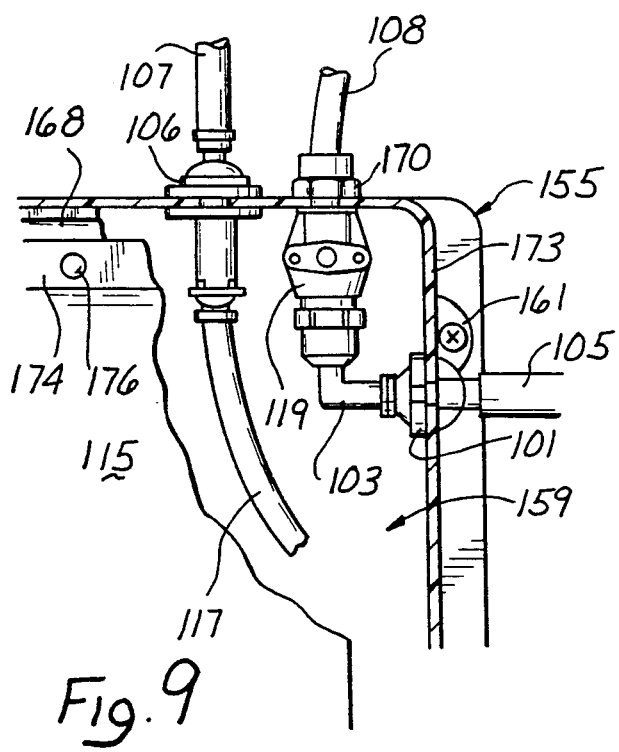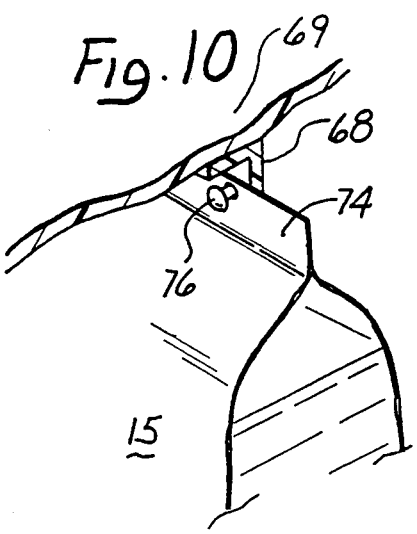

LIQUID STORAGE SYSTEM WITH UNPRESSURIZED RESERVOIR ENGAGABLE WITH LEVEL SENSORS

BACKGROUND OF THE INVENTION

Quantities of liquid medium-containing materials are often stored so as to be ready for use when needed. As used herein, the term "liquid medium-containing materials" are materials which include a liquid, for example, a major amount of liquid, and are flowable. Such materials may include solids and/or gases. In many instances, the rate at which such materials are supplied to a storage system is independent of the rate at which such materials are removed from the storage system for use. Such materials can be supplied to the storage system from production facilities directly linked to the storage system and/or by periodical deliveries from remote production facilities. The storage system advantageously maintains an adequate supply of the liquid medium-containing material to meet use demands without becoming overfilled. Further, where a production facility is directly linked to the storage system, the operation of such facility is beneficially not adversely impacted by the storage system. This is illustrated by considering a reverse osmosis module as such a production facility.

Reverse osmosis is a commonly used technique for removing impurities from drinking water. In a conventional reverse osmosis system, a reverse osmosis module is coupled to a source of feed water under pressure, and the module provides filtered product water having a reduced level of impurities as well as brine or waste water which is commonly dumped to drain. Reverse osmosis systems of this type are adapted for domestic household use as well as for other purposes.

A reverse osmosis module typically produces product water at a relatively slow rate. The demand for product water, although intermittent, is normally at a rate much greater than the instantaneous production capability of product water by the reverse osmosis module. Consequently, a reverse osmosis system typically includes a storage tank for storing product water it is produced so that the intermittent, but higher flow rate, demand can be met from the stored water in the tank. In order that this stored water can be provided under pressure to the water tap, it is common practice to employ some kind of accumulator or pressurized storage tank for storing of the product water.

A reverse osmosis module contains a reverse osmosis membrane for removing the impurities. A characteristic of these membranes is that their efficiency is greater at higher differential pressures across the membranes. For example, at higher differential pressures product water is produced at a faster rate. Also, a higher differential pressure across the membrane reduces the quantity of brine and therefore the water loss, and this is of particular importance in arid regions or regions where water shortages may exist.

One problem with an accumulator or pressurized storage tank for the product water is that they provide a back pressure on the membrane, and this reduces the differential pressure across the membrane with consequent slower production of product water and increased brine production. Thus, the pressurized storage system adversely impacts the performance of the reverse osmosis production facility. In addition, the means utilized for pressurization of the storage tank, whether in the form of an air chamber or spring biased members, can be expected to require additional space, and this is also a disadvantage especially for household systems which are commonly installed under the kitchen sink. Cost is also increased because the pressurized container must meet pressure vessel design standards.

SUMMARY OF THE INVENTION

This invention solves these problems by providing a liquid medium-containing material storage reservoir which provides no significant back pressure, for example, on the membrane of a reverse osmosis module. Moreover the reservoir is sealed to exclude airborne particulate matter and prevent the growth of organisms that require air.

With this invention, a flexible, closed and freely expandable reservoir is used to store liquid material, for example, product water from a reverse osmosis module. Although the reservoir may take different forms, it is preferably in the form of a flexible, closed bag which is freely expandable. Preferably, the bag is essentially nondistensible and the expansion of the bag occurs as a result of filling the bag with liquid medium-containing material without distending of the walls of the bag because distending or elastically stretching the bag would tend to create a back pressure, for example, on the reverse osmosis membrane.

The storage system of this invention is particularly adapted for use with a reverse osmosis module. However, the storage system of this invention can be used for storing of water or other liquid medium-containing materials which are not received from a reverse osmosis module. Such materials include, for example, highly evaporative substances, such as inks, alcohols and the like; fruit and vegetable juice concentrates; water runoff to drain from ice makers; hazardous materials; and in general, one or more liquid medium-containing materials from any processing facility. The present storage system can be adapted to store products, by-products and/or waste materials from production facilities. This storage system is very useful in conjunction with water purification facilities in general, and reverse osmosis modules in particular.

The storage system can advantageously include a supporting structure, a closed, flexible and freely expandable reservoir carried by the supporting structure, a supply conduit leading from the reservoir to a location where it can receive liquid medium-containing material from a source, a discharge conduit for delivering liquid medium-containing material from the reservoir and a control valve coupled, directly or indirectly, to the supply conduit. The control valve has an open position in which the valve allows liquid medium-containing material to flow through the supply conduit to the reservoir and a closed position in which the valve blocks flow of liquid medium-containing material through the supply conduit to the reservoir.

The supporting structure preferably includes a housing for substantially enclosing the bag. As such, the housing reduces the likelihood of the bag becoming punctured or damaged. The housing may also serve to house other components of the water storage system thereby facilitating its transportation and installation.

The liquid medium-containing material may be delivered from the reservoir through the discharge conduit in any of a variety of ways including gravity flow or with a pump. However, for many applications, a pump is preferred. A supply coupling may be used for coupling the supply conduit to the source of liquid medium-containing material and a discharge coupling may be used for coupling a discharge conduit to another conduit, such as one leading to a conventional household water tap. These couplings can advantageously be provided at or near the exterior of the housing to facilitate installation of the storage system.

The storage system may include other control components. For example, a pressure relief valve may be employed with the pressure relief valve communicating with the supply conduit between the control valve and the reservoir. Also, a check valve may be provided between the pressure relief valve and the reservoir for substantially blocking flow of liquid medium-containing material from the pressure relief valve to the reservoir.

Another advantage of the flexible reservoir is that it is uniquely adapted for use as part of a novel and advantageous liquid level sensing system. In this regard, the extent to which the reservoir is expanded by the product water provides an indication as to the level of liquid medium-containing material in the reservoir. Accordingly, by utilizing a level sensor engageable with the reservoir and responsive to predetermined expansion of the reservoir, liquid level sensing can be accomplished. This technique allows for liquid level sensing by a level sensor which is outside of the sealed reservoir and there is no need for providing the level sensor within the reservoir or to extend wires or other members through the walls of the reservoir to communicate the liquid level information outside of the reservoir.

With the liquid level sensed, this information can be used in a variety of ways such as to provide an indication of the liquid level within the reservoir and/or to control various components of the system. The liquid level information can be used to operate or control some means for controlling flow through the conduit leading to the reservoir such as the control valve or pump. For example, the level sensor can be used to put the control valve in the closed position when the reservoir is adequately filled with liquid medium-containing material or for opening the control valve to allow additional liquid medium-containing material to flow into the reservoir when the level of liquid medium-containing material in the reservoir drops below a predetermined level. Alternatively, or in addition thereto, the level sensor may be used to shut off the pump if the liquid level in the bag drops to a predetermined low level to thereby prevent the pump from running dry and possibly burning out the motor for the pump. The level information can also be used to provide a visual or audible indication of one or more liquid levels in the reservoir.

The level sensor can advantageously be operated by squeezing it between the reservoir and the supporting structure when the liquid level is at some predetermined level. In a preferred construction, the level sensor includes one or more actuators or switches carried by the supporting structure and engageable by the reservoir when the liquid level is at about an associated predetermined level. For example, if two switches are employed, they may be actuated by the reservoir in response to different liquid levels.

The invention, together with additional features and advantages thereof may best be understood by reference to the following description taken in connection with the accompanying illustrative drawings.

BRIEF DESCRIPTION OF THE DRAWINGS

FIG. 1 is a schematic view of a preferred embodiment of the invention.

FIG. 2 is a schematic view of a preferred control system of the invention.

FIG. 3 is a rear elevational view partially in section of a preferred embodiment of the invention with the flexible bag broken away.

FIG. 4 is an elevational view partly in section with the flexible bag full.

FIG. 5 is a view similar to FIG. 4 with the flexible bag nearly empty.

FIG. 6 is an enlarged fragmentary sectional view illustrating one way to coupled the supply and discharge conduits to the flexible bag.

FIG. 7 is an enlarged fragmentary sectional view illustrating one way to couple the control valve to the housing.

FIG. 8 is a schematic view of an alternate embodiment of the invention.

FIG. 9 is a partial rear elevational view partially in section of an alternate embodiment and of the invention with the flexible bag broken away.

FIG. 10 is an enlarged fragmentary perspective view, partially in section, illustrating one way to couple the bag to the cover.

DESCRIPTION OF THE PREFERRED EMBODIMENT

FIG. 1 shows a water storage system 11 which includes a reverse osmosis module 13 for producing product water and a flexible, closed and freely expandable reservoir 15. The system also includes a supply conduit 17 for conducting product water from the module 13 to the reservoir 15 and a control valve 19 movable between an open position in which the control valve allows product water to flow through the supply conduit 17 to the reservoir 15 and a closed position in which the control valve blocks flow of product water through the supply conduit to the reservoir. The system 11 also includes a discharge conduit 21 for delivering water from the reservoir 15 to, for example, a conventional domestic water tap 23. The system 11 may also include check valves 25 and 27, a pressure relief valve 29, a pump 31, pressure switch 32 and controls 33 (FIG. 2).

The system 11, and in particular the module 13 is coupled to a source 34, such as a city water supply, of feed water under pressure. The module 13, which may be a conventional reverse osmosis module, provides reverse osmosis filtered product water in the usual manner to the supply conduit 17 and waste or brine in a drain conduit 35 which leads to drain.

The control valve 19, which may be a conventional solenoid valve, is preferably controlled by the level of water in the reservoir 15. The control valve 19 is an on-off valve and is either in an open position to allow product water to flow through the supply conduit 17 to the reservoir 15 or in a closed position in which it blocks the flow of product water through the supply conduit to the reservoir. The valve 19 is preferably normally closed and is opened whenever water in the reservoir is below a predetermined level. Specifically, the valve 19 is preferably open except when the reservoir 15 is full, and a preferred system for controlling the valve 19 is embodied in the controls 33 which is described below in connection with FIG. 2.

The pressure relief valve 29 is an optional, but preferred, component of the system 11. The pressure relief valve 29 is coupled to the supply conduit 17, the discharge conduit 21 and the reservoir 15. It may be set to provide pressure relief at, for example, a pressure of about 2 psi. The discharge side of the pressure relief valve 29 is coupled to drain via a drain conduit 37.

As shown in FIG. 1, the supply conduit 17, the discharge conduit 21 and a conduit section 39 meet at a junction 41, and the inlet side of the pressure relief valve 29 is coupled to the junction 41. The conduit section 39 leads from the junction 41 through a series of passage conduits 40 to the reservoir 15, and as such, forms a portion of both the supply conduit 17 and the discharge conduit 21.

The check valve 25 is preferred when the pressure relief valve 29 is employed. The check valve 25 allows flow of product water from the junction 41 to the pressure relief valve 29 and blocks flow of water from the pressure relief valve 29 toward the junction 41 and reservoir 15. This prevents brine or water from the drain from entering the reservoir.

An important feature of the reservoir 15 is that it is flexible and freely expandable as product water is delivered to it. The reservoir 15 is freely expandable in the sense that it creates essentially no back pressure on the product water delivered to it by the supply conduit 17. This can be contrasted with an accumulator or other pressurized storage device which requires significant pressure for water entry into it. Because the reservoir 15 exerts substantially no back pressure on the water being supplied to it from the supply conduit 17, it does not reduce the differential pressure across the module 13 like an accumulator-type device would do. Accordingly, with the valve 19 open, the differential pressure across the module 13 may be nearly equal to the pressure of the feed water supplied by the source 34 to the module. Consequently, product water can be produced by the module 13 at a faster rate and the quantity of brine produced by the module for a given quantity of product water is reduced to thereby reduce the quantity of water that is wasted. When the control valve 19 is closed, there is no differential pressure across the module 13 and a pressure sensor (not shown) causes the production of product water and brine to be discontinued by the module in accordance with conventional practice.

Another important characteristic of the reservoir 15 is that it is closed and preferably sealed except for the conduit section 39. In other words, the conduit section 39 provides the only pathway into or out of the reservoir 15. Consequently, the water in the reservoir 15 is not exposed to air and the growth of biological materials which require air cannot take place.

The reservoir 15 may be of various different constructions that meet these criteria. In a preferred construction, the reservoir 15 is a flexible bag. For example, the reservoir 15 may be a bag of flexible polymeric material which is nondistensible. A particularly desirable form of bag is the bag commonly used for storage of soft drink syrup and juice concentrate in a bag in a box storage system.

The product water can be removed from the reservoir 15 through the discharge conduit 21 utilizing gravity flow or the pump 31. The pump 31 is preferred because the reservoir 15 may be located where gravity flow is not reasonably possible, such as beneath a kitchen sink.

Although various constructions are possible, in this embodiment, the pump 31 is a demand pump in that opening of the water tap 23 turns the pump 31 on. This is preferably accomplished through the use of the pressure switch 32 which senses a pressure drop resulting from opening the water tap 23 to turn the pump 31 on and which senses the pressure rise resulting from closing the water tap 23 to turn the pump off. For example, the pump 31 may be a positive displacement pump such as the type sold by Shurflo of Santa Ana, Calif. as Model No. 100. The check valve 27 may be integral with the pump 31 and be the outlet check valve of the pump, or the check valve 27 may be a separate valve outside of the pump between the pump and the pressure switch 32. When the pump 31 is used, it is desirable to utilize the check valve 27 to maintain the pressure in the discharge conduit downstream of the check valve 27 when the water tap 23 is closed.

FIG. 2 shows a preferred way to control the water storage system 11. The system 11 is controlled by a normally closed reservoir full switch 43, a normally open low water switch 45 and the pressure switch 32. Whenever the water level in the reservoir 15 is below a predetermined high level, the reservoir full switch 43 is closed to provide a circuit from a power source 49, which may be 24 volt a.c. power, through the control valve 19 to ground. Because the control valve 19 is normally closed, the energization of the control valve opens the valve to allow product water to be supplied to the reservoir 15 so long as the water level in the reservoir 15 is below the predetermined high level. Although the predetermined high level may be selected as desired, preferably it is a level at which the reservoir 15 is full or substantially full.

The pump 31 is driven by 24 volt d.c. power form a rectifier 51 and is controlled by the low water switch 45 and the pressure switch 32. The low water switch 45 is open whenever the level of water in the reservoir 15 is below a selected low level. With the water level above this low level, the low water switch 45 is closed.

When the water tap 23 is open, there is a drop in pressure in the discharge conduit 21 downstream of the pump 31 which is sensed by the pressure switch 32. This drop in pressure causes the pressure switch to close to complete a circuit through the motor of the pump 31 to turn the pump on. So long as the water level in the reservoir 15 is above the selected low level, the pump 31 is cycled on and off by the pressure switch 32 responding to the water tap 23 in the usual demand fashion. However, if the water level in reservoir 15 drops below this selected low level, the switch 45 opens to prevent further operation of the pump 31 and to extinguish the indicator light 53. The selected low level can be determined as desired, but preferably is a level at which the reservoir is just about empty. This arrangement prevents the pump 31 from running dry and possibly burning out the pump motor. The pressure switch 32 may be integral with the pump 31 if desired.

FIGS. 3-7 show one preferred way for implementing the water storage system 11. As shown in FIGS. 3-5, the water storage system also includes a supporting structure in the form of a housing 55 which carries, and in this embodiment encloses, the reservoir 15 as well as other components of the system. The housing 55, which is preferably rigid, includes a rigid back wall 57 and a rigid cover 59 removably attached to the back wall 57 in any suitable manner such as by threaded fasteners 61. The housing 55 may be constructed of a suitable rigid polymeric material and is preferably sufficiently rigid to protect it contents especially the reservoir 15.

The cover 59 provides a bottom wall 67, a top wall 69, a front wall 71 and opposite side walls 73. The control valve 19 is suitably mounted on the top wall 69 as by a conventional supply coupling or fitting 70 (FIG. 7).

The supply conduit 17 has a supply conduit section 75 within the housing 55 and a supply conduit section 77 (FIG. 2) outside the housing which is coupled to the module 13 (FIG. 1). In this embodiment, the fitting 70 also serves as a supply coupling for coupling the supply conduit section 77 to the supply conduit section 75.

Similarly, the discharge conduit 21 includes a discharge conduit section 79 within the housing 55 and a discharge conduit section 81 (FIG. 2) outside the housing leading to the water tap 23 (FIG. 1). The system 11 includes a discharge coupling or fitting 83, which may be identical to the fitting 70, for coupling the pressure switch 32 to the top wall 69 and to the discharge conduit section 81. Because the fittings 70 and 83 are mounted on the top wall 69, they are accessible for easy manual connection to the conduit sections 77 and 81.

The supply conduit 17 and in particular the supply conduit section 75 extends to a fitting 85, one form of which is shown in FIG. 6. As shown in FIG. 6, the fitting 85 includes fitting sections 84 and 86 which are threaded together and which clamp a region of the reservoir 15 between them to form a fluid-tight seal. With this construction, the fitting 85 provides the junction 41 and the conduit section 39 shown in FIG. 1 leading from the junction 41 to the interior of the reservoir 15. More specifically, a threaded portion of the fitting sections 84 extends through an opening 87 in the reservoir and by tightly screwing the fitting sections 84 and 86 together, a fluid-tight seal is formed around the opening 87. The fitting 85 also has ports 91, 93, and 95 for coupling to the supply conduit section 75, the discharge conduit section 79 and to the check valve 25, respectively.

The top of reservoir 15 is preferably secured to the top wall 69 of the cover 59. This securement or attachment, which can be accomplished with various constructions, advantageously positions the reservoir 15 so as to reduce the risks of the reservoir not expanding to its completely filled volume. In the embodiment shown in FIGS. 4, 5, and 10 an L-shaped angle member 68 is secured to the top wall 69. The downwardly extending leg 72 of L-shaped angle member 68 includes a plurality of holes. Reservoir 15 is constructed so as to have a seam 74 which extends outwardly away from the body of the reservoir and includes a plurality of holes. A plurality of fastener pins 76 (only one shown) are provided. Each of the fastener pins 76 passes through a single hole in seam 74 and a single hole in leg 72 and is sized and adapted to be fastened by leg 72. With the plurality of fastener pins 76 so positioned, reservoir 15 is firmly secured to top wall 69.

The pump 31 is suitably coupled into the discharge conduit section 79, and the same is true of the check valve 27. The check valve 25 is suitably coupled to the fitting 85 as shown in FIG. 3 and the pressure relief valve 29 may be suitably attached to the side wall 73 outside the housing 55 as shown in FIG. 3 or, if preferred within the housing.

The conduit sections 75 and 79 may be polymeric or elastomeric tubing possessing the desired flexibility or rigidity. Appropriate fittings, such as elbows, may be provided as desired within the various conduit sections shown in FIG. 3.

Another feature of the invention is level sensing of the product water within the reservoir 15. Because the reservoir 15 is expandable, there is a relationship between the extent to which the reservoir is expanded by product water and the level of product water in the reservoir. The system 11 includes a level sensor engageable with the reservoir 15 for sensing the height or level of the liquid in the reservoir. This is simply and inexpensively accomplished by mounting the reservoir full switch 43 and the low water switch 45 on the front wall 71 of the housing 55 as shown in FIGS. 4 and 5. With the reservoir 15 full as shown in FIG. 4, the reservoir engages both of the switches 43 and 45 and squeezes them against the rigid back wall 57 of the reservoir 15 to place the switch 43 in the open position and the switch 45 in the closed position. Consequently, the circuit to the control valve 19 is open (FIG. 2) so that the normally closed control valve 19 is closed. In addition, the switch 45 is closed so that the pump 31 is operated by the pressure response 32 in response to opening and closing of the water tap 23 as described above.

When the water level in the reservoir 15 drops below the height of the switch 43, the reservoir 15 can no longer act against the switch 43 and this switch is then allowed to return to its normally closed position. This energizes the control valve 19 and opens it to allow the production of product water and its flow into the reservoir 15 to resume.

If the level of water in the reservoir 15 drops below the low water switch 45 so that the water in the reservoir 15 no longer presses against this switch (FIG. 5), then this switch is allowed to move to its normally open position (FIG. 2) in which it prevents the pump 31 from being turned on. This prevents running of the pump when the reservoir 15 is dry, and this lock out condition exists until the water level in the reservoir 15 is restored to a level above the switch 45.

Of course, various multiple state devices which can be actuated by the reservoir 15 can be used in lieu of the switches 43 and 45. Also, the switches 43 and 45 perform level sensing functions, and this water level information can be used in other ways to perform system control functions. The number of levels sensed by the level sensor as well as the specific levels sensed can be selected as desired.

FIGS. 8 and 9 show a water storage system 111, which is also an embodiment of the present invention. Except as expressly stated herein, system 111 is structured and functions substantially as does system 11. Each component of the system 111 which corresponds to a component of system 11 has the same reference numeral as such corresponding component of system 11 increased by 100. The primary differences between system 111 and system 11 are the placement of the control valve and the presence of additional ports in the housing.

Referring to FIG. 8, water storage system 111 includes reverse osmosis module 113, reservoir 115, and a control valve 119. The system 111 also includes a discharge conduit 121, check valves 125 and 127, a pressure relief valve 129, a pump 131 and pressure switch 132.

Control valve 119 is positioned between source 134 and module 113. Locating control valve 119 here rather than in the supply conduit (as in system 11) provides the advantage of subjecting module 113 to reduced pressure when no product water is flowing from supply conduit 117 into reservoir 115. This reduces the stress on module 113 and ma increase the useful life of the membrane in the module. The closing of valve 119 effectively acts to prevent or block the flow of product water into reservoir 115. Thus, control valve 119 may be considered to be indirectly coupled to supply conduit 117.

FIG. 9 shows one preferred way of implementing the water storage system 111. Housing 155 includes two additional ports. First bulkhead fitting 101 is secured to housing 155 through one of these additional ports and is coupled to conduits 103 and 105. Conduit 103 provides fluid communication between control valve 119 and fitting 101, while conduit 105 provides fluid communication between fitting 101 and the reverse osmosis module 113. Second bulkhead fitting 106 is secured to housing 155 through the other of the additional ports and is coupled to conduit 107 and supply conduit 117. Conduit 107 provides fluid communication between the product side of module 113 and fitting 106. Conduit 108 provides fluid communication between source 134 and control valve 119.

Except as noted herein, system 111 functions in a manner similar to system 11 and obtains similar results.

It should be noted that system 111 can be easily converted to be structured and function as system 11. This can be done as follows. Conduit 108 is removed from source 134. Conduit 105 is removed from first bulkhead fitting 101 and is joined to source 134 to provide fluid communication between the source and the module 113. Conduit 108 is coupled to the product side of module 113. Conduit 103 is removed from both control valve 119 and first bulkhead fitting 101. Finally, supply conduit 117 is removed from second bulkhead fitting 101 and is coupled to control valve 119. System 111, after these changes, is configured similarly to system 11.

System 11 can thus be configured, as desired, to function as schematically illustrated in either FIG. 1 or FIG. 8.

Although an exemplary embodiment of the invention has been shown and described, many changes, modifications and substitutions may be made by one having ordinary skill in the art without necessarily departing from the spirit and scope of this invention.

We claim:

1. A liquid medium storage system comprising:
   an assembly adapted for producing a liquid medium-containing material from a source of feed material;
   a flexible, closed and expandable reservoir;
   a supporting structure adjacent the reservoir;
   a supply conduit for conducting liquid medium-containing material from the assembly to the reservoir whereby liquid medium-containing material can be supplied to the reservoir to expand the reservoir, the extent to which the reservoir expands providing an indication as to the level of liquid-medium containing material in the reservoir;
   a control valve movable between an open position in which the control valve allows liquid medium-containing material to flow through the supply conduit to the reservoir and a closed position in which the control valve blocks flow of liquid medium-containing material through the supply conduit to the reservoir;
   a discharge conduit for delivering liquid medium-containing material from the reservoir; and
   a level sensor including first and second actuators carried by the supporting structure at different elevations, said first actuator being arranged such that it is engageable by the reservoir for activation in response to the liquid medium-containing material level being at about a first predetermined level to move the control valve to the closed position and the second actuator being engageable by the reservoir and activated by the reservoir when the liquid medium-containing material level is at about a second level, and said second level being below the first level.

2. A system as defined in claim 1 wherein the assembly comprises a reverse osmosis module, the liquid medium-containing material is product water and the feed material is feed water, the reverse osmosis module being connectible to the source of feed water which is under pressure.

3. A system as defined in claim 1 wherein the reservoir includes a flexible bag.

4. A system as defined in claim 3 including a housing and said flexible bag is in the housing.

5. A system as defined in claim 1 including a pump for pumping liquid medium-containing material from the reservoir through the discharge conduit.

6. A system as defined in claim 5 wherein the activation of the second actuator prevents operation of the pump.

7. A system as defined in claim 1 including a pressure relief valve communicating with the supply conduit between the control valve and the reservoir.

8. A system as defined in claim 7 including a check valve between the pressure relief valve and the reservoir for substantially blocking flow of liquid medium-containing material from pressure relief valve to the reservoir.

9. A liquid medium-containing material storage system for receiving liquid medium-containing material from a source of liquid medium-containing material, said storage system comprising:
   a supporting structure;
   a closed, flexible bag carried by said supporting structure, said flexible bag being freely expandable;
   a supply conduit section extending from the bag to a location where it can receive liquid medium-containing material from the source and carry, liquid medium-containing material to the bag, the extent to which the bag expands providing an indication as to the level of liquid medium-containing material in the bag;
   a discharge conduit section for delivering liquid medium containing material from the bag;
   a pump for pumping the liquid-medium containing material from the bag and through the discharge conduit section;
   a level sensor including first and second switches carried by the supporting structure outside the reservoir at different elevations, said first switch being arranged such that it is engageable by the reservoir for activation in response to the liquid medium-containing material level being at about a first predetermined level and the second switch being engageable by the reservoir and activated by the reservoir when the liquid medium-containing material level is at about a second level, and said second level being below the first level; and
   said pump being prevented from running by the actuation of said second switch.

10. The storage system as defined in claim 9 wherein the liquid medium-containing material is product water from a source of reverse osmosis filtered product water.

11. A storage system as defined in claim 9 including a supply coupling for coupling the supply conduit section to the source of liquid medium-containing material and a discharge coupling for coupling the discharge conduit section to another conduit section.

12. A storage system as defined in claim 9 including a control valve coupled to the supply conduit section, said control valve having an open position in which the control valve allows liquid medium-containing material to flow through the supply conduit section to the flexible bag and a closed position in which the control valve blocks flow of liquid medium-containing material through the supply conduit section to the flexible bag and wherein the valve is in the closed position in response to the first switch being activated.

13. A storage system as defined in claim 9 including a control valve coupled to the supply conduit section, said control valve having an open position in which the control valve allows liquid medium-containing material to flow through the supply conduit section to the flexible bag and a closed position in which the control valve blocks flow of liquid medium-containing material through the supply conduit section to the flexible bag and wherein the valve is in the closed position in response to the first switch not being activated.

14. A storage system as defined in claim 9 wherein the supporting structure includes a housing substantially enclosing the bag.

15. A system comprising:
a flexible and expandable reservoir, said reservoir being adapted to contain a liquid medium-containing material with the degree of expansion of the reservoir being indicative of the level of liquid medium-containing material in the reservoir;
a supporting structure adjacent the reservoir; and
a level sensor including first and second switches carried by the supporting structure outside the reservoir at different elevations, said first switch being arranged such that it is engageable by the reservoir for activation in response to the liquid medium-containing material level being at about a first predetermined level and the second switch being engageable by the reservoir and activated by the reservoir when the liquid medium-containing material level is at about a second level, and said second level being below the first level.

16. A system as described in claim 15 wherein the first switch is squeezed between the reservoir and the supporting structure when the liquid medium-containing material level is at about said first predetermined level to activate the first switch.

17. A system as described in claim 15 including a conduit coupled to the reservoir and means responsive to at lest one of said first and second switches for enabling flow of the material through the conduit.

18. A system as described in claim 17 wherein the enabling means includes a control valve which blocks flow through the conduit in response to activation of said first switch.

19. A system as described in claim 17 wherein the enabling means includes a pump coupled to the conduit, said pump is prevented from running in response to the second switch not being activated.

* * * * *